May 28, 1968

G. E. EDWARDS 3,385,775

PRODUCTION OF HALOGENATED ORGANIC COMPOUNDS
IN FUSED ELECTROLYTE

Filed Oct. 28, 1964

INVENTOR
GEORGE ERNEST EDWARDS
BY Cushman, Darby & Cushman
ATTORNEYS

May 28, 1968

G. E. EDWARDS 3,385,775

PRODUCTION OF HALOGENATED ORGANIC COMPOUNDS
IN FUSED ELECTROLYTE

Filed Oct. 28, 1964

INVENTOR
GEORGE ERNEST EDWARDS

By
Cushman, Darby & Cushman
ATTORNEYS

May 28, 1968

G. E. EDWARDS 3,385,775

PRODUCTION OF HALOGENATED ORGANIC COMPOUNDS
IN FUSED ELECTROLYTE

Filed Oct. 28, 1964

INVENTOR
GEORGE ERNEST EDWARDS
By Cushman, Darby & Cushman
ATTORNEYS 3,385,775
PRODUCTION OF HALOGENATED ORGANIC
COMPOUNDS IN FUSED ELECTROLYTE
George Ernest Edwards, Runcorn, England, assignor to Imperial Chemical Industries Limited, London, England, a corporation of Great Britain
Filed Oct. 28, 1964, Ser. No. 407,260
Claims priority, application Great Britain, Oct. 28, 1963, 42,395/63
12 Claims. (Cl. 204—62)

ABSTRACT OF THE DISCLOSURE

There is provided a process for halogenating organic compounds by electrolyzing a fused electrolyte consisting essentially of at least one organic compound, notably hydrocarbons and partially halogenated derivatives thereof, and at least one metallic halide which on electrolysis yields free halogen other than fluorine. Representative metallic halides are the halides of aluminum, boron, gallium, magnesium, zinc, iron and mercury, for example, aluminum chloride. A hydrogen halide, particularly hydrochloric acid, may be included in the electrolyte to minimize solid deposits on the cathode. Alkali metal, alkaline earth metal or hydrogen halides may also be included in the melt to lower the melting point thereof.

---

Figure 1:
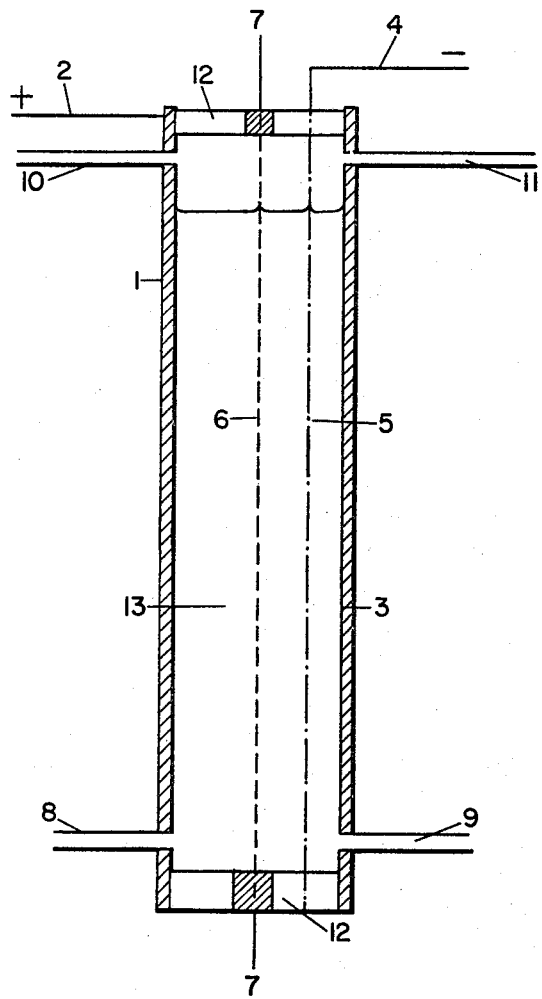

This invention relates to a process for the production of halogenated organic compounds and more particularly to a process for producing chlorinated hydrocarbons electrolytically.

An electrochemical process for the manufacture of fluorine-containing carbon compounds by electrolysis, of a mixture containing anhydrous hydrogen fluoride and an organic compound, at a voltage which is insufficient to generate fluorine, is known from U.S. patent specification No. 2,519,983. However, this process involves the use of an electrolyte based on liquid hydrogen fluoride, and is strictly limited to the production of fluorinated compounds.

We have now found a new electrolytic process whereby halogenated organic compounds may be produced.

Thus according to our invention we provide a process for the halogenation, and preferably the chlorination, of organic compounds which comprises electrolysing a fluid electrolyte containing an organic compound and electrolytically available halogen other than fluorine.

By an electrolyte containing electrolytically available halogen we mean an electrolyte which on electrolysis in the absence of an organic compound yields free halogen.

It is preferred that the organic compound should interact with the other components of the electrolyte, that is that it should dissolve in or form some complex with these other components. The precise nature of the complex or solution present in our electrolyte is not clear but it appears to be sufficient that the other components of the electrolyte have an affinity for the organic compound and can absorb it to form a conducting fluid phase.

The electrolyte composition may advantageously contain a metal halide capable of interacting with the organic compound to be halogenated, and in addition one or more components which can improve the fluidity of the composition at the temperature of use; examples of such additional components include alkali metal and alkaline earth metal halides and hydrogen halides.

When a complex-forming metal halide present in the electrolyte can also form a complex with the alkali metal or other halides present in the electrolyte composition, it may be necessary to use it in a proportion sufficient to provide an excess above that required for complex-formation with any components, other than the organic compound, from which the electrolyte composition is made up.

In the case of some organic compounds, for example hydrocarbons, it may be necessary to add hydrogen halide to bring about the requisite interaction between the organic compound and the metal halide.

My process is especially applicable to the production of chlorinated organic compounds, by the use of an electrolyte composition containing the requisite metal or metals as chlorides. If desired, however, other halides may be used in place of or in addition to the chlorides.

Metal halides which can form complexes with organic compounds include the halides of aluminium, boron, gallium, magnesium, zinc, iron and mercury and mixtures thereof, for example of boron and aluminium halides, but we prefer to use an aluminium halide especially aluminium chloride. The nature of the complex and its precise function in my process are not clear, but it appears that a polar or ionisable complex may be present in the electrolyte composition.

The alkali metal halide is most conveniently a sodium halide and particularly sodium chloride, primarily on a basis of cost and availability, though the halides (and particularly the chlorides) of other alkali metals for example potassium or lithium or mixtures thereof may be used if desired. The alkali metal halide may be replaced, in whole or in part, by one or more alkaline earth metal halides.

The organic compound to be halogenated may be in particular a hydrocarbon, though the process of my invention may be applied to the halogenation of other organic compounds containing at least one hydrogen atom or substituent replaceable by halogen, for example ethers, and ketones. Suitable hydrocarbons include alkanes, for example methane and ethane, aromatic hydrocarbons for example benzene and toluene, and cycloaliphatic hydrocarbons for example cyclohexane, and mixtures thereof. If the hydrocarbon is unsaturated, the halogenation may be by way of addition and/or substitution reactions, depending upon the conditions of electrolysis. Partially halogenated derivatives of such compounds may also be used, for example ethyl chloride, dichloroethane or chlorobenzene, and these may be converted to more highly halogenated products.

It is preferred that the proportions of the alkali metal halide (and/or alkaline earth metal halide) and the complex-forming metal halide should be adjusted to provide a conveniently low melting point for the electrolyte composition. This may be achieved by using mixtures of several salts, for example a sodium chloride/aluminium chloride mixture to which minor proportions of other salts such as fluorides or bromides (conveniently alkali metal salts), or alkaline earth metal halides or combinations thereof have been added to depress the melting point. A composition approximating to a eutectic mixture having a melting point below the melting point of the component salts is particularly useful in providing an electrolyte of adequate fluidity.

It is preferred that the electrolye composition is substantially anhydrous to minimise hydrolysis of any complex containing the organic compound; however minor proportions of water in some cases may be tolerated.

The electrolyte composition may be made up by mixing or heating together the component metal halide or halides and the organic compound. Usually, on account of either the physical properties of the organic compound or the heat liberated during its interaction with the metal salt, it is more convenient either (a) to add the organic compound, or the organic compound in conjunction with a hydrogen halide, to a molten mixture of the metal halide, or (b) to form first the complex or solution of the organic compound with or in the metal halides (e.g. aluminium chloride) and then to dissolve this complex in a melt of the remaining salt or salts required to form the electrolyte composition (e.g. sodium chloride). The electrolyte composition may be made directly before use, being then conveniently transferred in the fluid state to the electrolysis cell, or may be allowed to cool and stored for use later. It is preferred that access of moisture to the electrolyte composition should be avoided at all stages, and that the components used for making it should be substantially anhydrous. Care may need to be taken during production of the electrolyte composition to avoid any rise in temperature in the mixture which could decompose the organic compound.

We have found that in general our process yields the more highly halogenated derivatives of the organic compound; thus for example ethane has yielded perchloroethylene, hexachloroethane, and sym-tetrachloroethane. However, less highly halogenated compounds can also be produced, such as ethyl chloride from ethane.

The electrolytic cell for carrying out my process is preferably one in which mixing of the products from the anode and cathode is prevented, for example by the shape of the cell or by an intervening partition or diaphragm. Any such diaphragm should be made of material which is resistant to the electrolyte or products of electrolysis and provides a continuous electrolyte path for the passage of current, as for example sintered glass or woven glass cloth. Conduction may be mono-, bi- or poly-ionic, an may be entirely by positive or negative ions or by both in any proportion.

The electrolysis may be carried out at any temperature at which the electrolyte composition is fluid but below the temperature at which either the halogenated product or the organic compound from which it is derived undergo excessive thermal degradation, and preferably at a temperature in the range 90° to 220° C. We prefer to carry out the electrolysis at a potential of between 2 and 10 volts and preferably between 2 and 5 volts.

During electrolysis according to our process, we have found that the presence of free halogen (e.g. chlorine) in the anolyte is hardly detectable in many instances, for example when producing a chlorinated hydrocarbon from a hydrocarbon. When no hydrocarbon is fed into the anolyte, copious amounts of chlorine are detectable during electrolysis (e.g. using iodide-starch indicator).

As the organic constituent of the electrolyte is converted at the anode during electrolysis to a chlorinated derivative thereof, the supply of organic compound for chlorination can be maintained either by addition of more of the compound itself (for example a hydrocarbon) to the electrolyte melt or by addition of a pre-formed complex, for example an aluminium chloride/hydrocarbon complex, or an aluminium chloride/hydrocarbon/hydrogen chloride complex. If the organic compound is gaseous or easily vapourised, it may conveniently be added by bubbling into the electrolyte in the zone adjacent to the anode. Depending upon the constitution of the electrolyte, the electrolysis conditions, and the particular organic compound concerned, the halogenated product may be retained in or released from the electrolyte. If the product has sufficient volatility, it may be volatilised from the cell and may be recovered from the exit gases by conventional methods, for example condensation and fractional distillation. If it is not sufficiently volatile it may be separated for example by solvent extraction or crystallisation, or combinations of such techniques. Any hydrogen halide emerging from the cell may be recycled back into the cell.

The materials of which the cell is constructed, and in particular the electrodes, may be any of those known in the art to have adequate stability to the thermal and chemical conditions therein. Thus the anode may be for example made of platinum or nickel or (over a rather more limited temperature range) iron, aluminium, carbon or graphite. The cathode may be for example made of iron, vanadium, tungsten, nickel, platinum, carbon or graphite.

The general electrolysis conditions may be varied considerably. The current density to be used, for example, may tend to be limited by the current-carrying capacity of any diaphragm employed and is therefore usually dependent upon the particular cell design.

The procedure of my invention may be utilised to achieve varying degrees of halogenation, by appropriate choice of electrolyte and electrolysis conditions. To effect further halogenation, the intermediate halogenated product should be retained in the electrolyte long enough for the required further halogenation to take place. Thus for example, the anode compartment of the cell may be made long in proportion to its cross section so that overall thorough mixing within the compartment is retarded and there is a progressive passage of electrolyte through zones in which the initial complex (e.g. ethane/aluminium chloride) is halogenated and then in which the complex of the partially halogenated product (e.g. ethyl chloride/aluminium chloride) is halogenated further.

To minimise the formation of troublesome cathode products, for example solid deposits containing alkali metal or other metals or metal hydrides, additions may be made to the electrolyte in the zone adjacent to the cathode of a material which can convert such deposits into soluble form or prevent their deposition. A particularly convenient additive for the purpose is a hydrogen halide, particularly hydrogen chloride, which can be pass as a continuous or intermittent stream through the electrolyte. If desired, hydrogen chloride may be added to both the anode and cathode zones.

Figure 2:
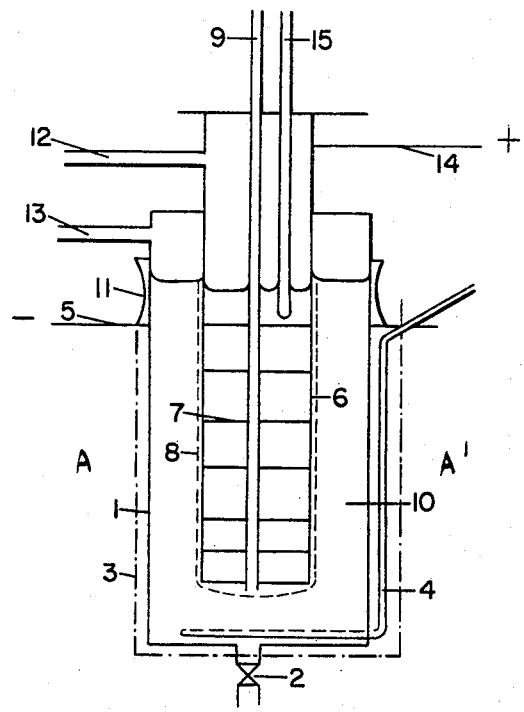
Figure 3:
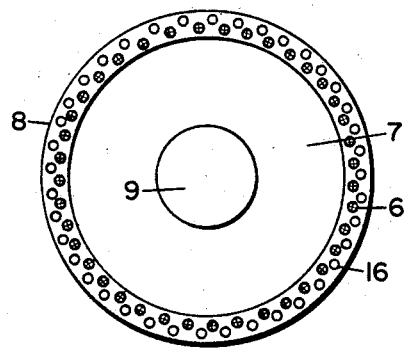
Figure 4:
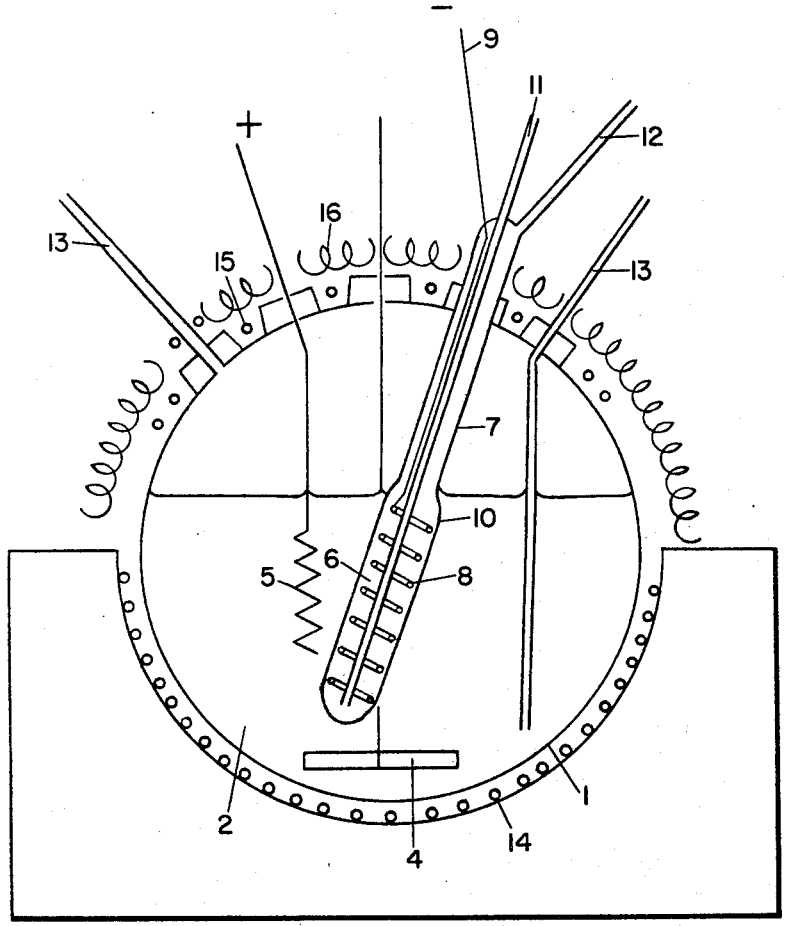

Cells suitable for operation of the process of my invention are illustrated but in no way limited by reference to the attached drawings, in which FIG. 1 represents a cross section through a rectangular cell, FIG. 2 represents a cross section through a cylindrical cell, FIG. 3 represents a cross section of the anode assembly of FIG. 2 along the line A—A', and FIG. 4 represents a cross section through a spherical cell.

In FIG. 1 the wall 1 (conveniently made of nickel) of the cell acts as an anode and is connected to a positive lead 2. The opposite wall 3 of the cell is conveniently made of mild steel. A negative lead 4 is connected to a gauze cathode 5 (conveniently made of iron gauze) which is separated from the cathode by a diaphragm 6 (conveniently made of woven glass cloth) held in a frame 7, conveniently made of mild steel. The glass cloth diaphragm should be washed in chromic acid, rinsed with water and dried before use. Inlet pipes 8 and 9 are used to introduce ethane and dry HCl gas into the base of the anode and cathode compartments respectively. Outlet pipes 10 and 11 conduct gases evolved from the anode and cathode compartment respectively out of the cell. The gases evolved from the anode compartment may be lead via pipe 10 to a cold trap (not shown) where any easily liquefiable components will be condensed. The top and bottom of the cell are sealed with gaskets 12 conveniently of polytetrafluoroethylene, to prevent escape of gas or of the melt 13.

In use the whole cell is enclosed in a furnace whose temperature may be controlled as desired.

In FIG. 2 a mild steel cylinder 1 which acts as the outer casing of the cell and which has a drain tap 2 at its base is surrounded by trace heating and thermal lagging 3. A pipe 4 perforated at its lower end is used to conduct HCl gas into the base of the cell. The mild steel casing 1 which also acts as anode is connected to a negative supply of electricity 5. Supported inside the casing 1 is an anode assembly which consists of a number of nickel rods 6 spaced around and electrically connected to the edge of perforated nickel discs 7. Around the outside of this anode assembly is fitted a woven glass sock 8 which acts as a diaphragm. Ethane gas may be introduced to the base of the anode compartment by means of the tube 9. The level of the melt 10 in the container 1 may be observed through the sight glass 11. Gases escaping from the anode compartment will pass out through tube 12 and those escaping from the cathode compartment through tube 13. The anode is connected to a positive lead 14. 15 represents a thermocouple pocket reaching below the surface of the melt in the anode compartment.

FIG. 3 represents a cross section of the anode assembly along the line A—A' in FIG. 2 and shows the ethane feed pipe 9, a spacer disc 7, nickel rods 6 and polytetrafluoroethylene spacer rods 16 surrounded by the woven glass sock 8.

In FIG. 4 a spherical glass flask 1 contains the molten electrolyte 2 into which dips a pipe 3 through which ethane may be passed. Also dipping into the melt are a stirrer 4, a helical coil of nickel wire 5 which acts as anode, and a cathode assembly 6. The cathode assembly consists of a glass former 7 attached to which is a helical coil of iron wire 8 which in turn is connected to a negative lead 9, the coil 8 being surrounded by a woven glass cloth sleeve 10. A pipe 11 leads down the centre of the cathode assembly and terminates at the base of the iron coil 8. This pipe is used to supply HCl gas to the cathode space. Gases evolved in the cathode assembly are lead out of the cell via the pipe 12. Gases evolved by the anode assembly are lead out of the cell to a cold trap (not shown) by a pipe 13. The flask was heated on an isomantle 14, and local heating coils 15 and thermal insulation 16 were provided around the top of the flask.

The invention is illustrated but not limited by the following examples, in which the parts and percentages are by weight.

EXAMPLE 1

An electrolyte composition was made up by fusing together sodium chloraluminate (NaAlCl$_4$) (240 parts) and anhydrous aluminium chloride 50 parts). This material corresponded to sodium chloraluminate (NaAlCl$_4$) containing additionally 17.3% of aluminium chloride.

This electrolyte composition was electrolysed at a temperature maintained in the range 164° to 174° C. as anolyte in a U-shaped cell made of glass, having anode and cathode compartments separated by a sintered glass diaphragm, and having a nickel anode and a mild steel cathode. Sodium chloraluminate was used as catholyte.

The cell was made up from glass tubes 1 inch (2.5 cm.) in diameter with a sintered glass disc 1.5 cm. in diameter at the bottom arm of the U. The anode was a helix of flattened nickel wire and the cathode was a helix of mild steel wire.

Electrolysis was carried out for 135 minutes while a dry mixture of equimolar proportions of ethane and hydrogen chloride was passed into the anolyte through a dip tube, and hydrogen chloride was passed into the catholyte. The electrolysing current was 0.2 ampere. The ethane used was a commercial cylinder grade (analysis: ethane 96%, ethylene 3%, methane 0.5%, propylene 0.5%, acetylene 100 p.p.m.).

Hydrogen was evolved at the cathode, in a volume at first approximately to 100° efficiency on the current passing.

The gas emerging from the anode compartment, containing the excess of ethane and hydrogen chloride fed in, was passed through a condenser maintained at −78° C., and a liquid condensate was obtained. This condensate was found by analysis (vapour phase chromatography and infra-red spectroscopy) to be mainly ethyl chloride, with minor proportions of 1:2-dichloroethane, hexachloroethane, tetrachloroethylene, and trans-dichloroethylene, and some ethane and heydrogen chloride.

EXAMPLE 2

An electrolyte was prepared by fusing 148 gm. of aluminium chloride with 60 gm. of sodium chloride. The melt thus consisted of 200 gm. of sodium chloraluminate (NaAlCl$_4$) with 4% excess of aluminium chloride. The molten mixture was electrolysed in a rectangular cell similar to that shown in FIG. 1. The product collection system was wrapped with aluminium foil to exclude light. The glass cloth diaphragm, prior to assembly, was washed with chromic acid and dried.

Commercial cylinder ethane, scrubbed in a tower containing a fluid consisting of 14 parts of 2% silver nitrate in sulphuric acid mixed with 1 part of a saturated solution of nickel sulphate in sulphuric acid, was passed at the rate of 1.2 l./hr. upwards through the anolyte compartment. Dry hydrogen chloride was passed at a rate of 3.3 l./hr. upwards through the catholyte compartment.

Electrolysis was carried out for 75 minutes with the melt at 190° C. and approximately atmospheric pressure with an electrolysing current of 2 amps at a potential of 4 volts. The 0.55 litre of gas evolved from the cathode was collected in a Marriotte bottle. The gas evolved from the anode compartment was passed through heated lines to a trap cooled to −70° C. At the conclusion of the electrolysis the product in the trap was diluted with reagent grade carbon tetrachloride and the solution analysed by vapour phase chromatography. The analysis showed that the product collected in the trap contained 0.22 g. of tetrachloroethylene and 0.23 gm. of hexachloroethane. No chlorine was detected in the anolyte gas stream or by the analysis of the product.

EXAMPLE 3

The procedure of Example 2 was repeated except that an average current of 5 amps was passed for 3½ hrs. at an electrolysing potential of 4 volts. 1.75 litres of gas were evolved at the cathode, and the anoidic product was found to contain 0.85 gm. of hexachloroethane and 1 gm. of tetrachloroethylene.

EXAMPLE 4

A mixture of 4.275 kg. of sodium chloraluminate and 225 gm. of aluminium chloride was electrolysed in a cell as shown in FIGS. 2 and 3 comprising a cylindrical mild steel body which served as the cathode and a concentric nickel wire cage on which was wrapped a woven glass cloth diaphragm which had been pretreated as in Example 2.

Ethane scrubbed as in Example 2 was passed through the anolyte at a rate of 3 litres/hr. and dry halogen chloride through the catholyte at a rate of 10 litres/hr. Electrolysis was carried out at 180° C. and atmospheric pressure at an electrolysing current of 10 amps, and a potential of 3.4 volts. In the course of a 1 hr. run following a pre-electrolysing period of 5 hours the volume of gas evolved at the cathode was 4.5 litres. The anode product stream and analysed as in Example 2 contained 2.1 gm. of hexachloroethane. The anode product stream whose flowrate was 4.4 litres/hr. contained 20% v./v. chlorine.

EXAMPLE 5

The procedure of Example 4 was repeated, except that electrolysis was carried out at a temperature of 200° C. and the product was collected over a period of 2 hours. 8.3 litres of gas are evolved at the cathode. Gas evolved at the anode contained 0.90 litre of chlorine, 7.2 gm. of hexachloroethane, 0.625 gm. of sym-tetrachloroethane and 0.14 gm. of tetrachloroethylene.

EXAMPLE 6

A melt containing sodium aluminate and a 10% excess of aluminium chloride was used as anolyte and a melt of sodium aluminate was used as catholyte in the cell shown in FIG. 4.

Ethane purified as in Example 2 was passed through the anolyte at a rate of 1.67 litres/hr. and dry HCl was passed through a catholyte at a rate of 1.8 litres/hr. for a period of 3½ hours. A current of 3.1 amps at a potential of between 4.5 and 5 volts was used. The temperature at which electrolysis took place was 183–190° C. and the product evolved from the anode contained 0.67 gm. of hexachloroethane and 1.53 gms. of tetrachloroethylene.

EXAMPLE 7

A melt consisting of 110 gms. of anhydrous ferric chloride and 40 gms. of sodium chloride was contained in the anolyte compartment of a simple U tube type of cell and a melt consisting of 105 gms. of aluminium chloride and 45 gms. of sodium chloride was contained in the catholyte compartment. The glass cell consists of two vertical arms 1.5 inches (3.8 cms.) diameter and 5 inches (12.7 cms.) long connected at the bottom via a 20 mm. diameter No. 0 porosity sintered glass disc which served as the diaphragm. Provision was made for gas feeds to the anolyte and catholyte compartments via dip pipes through the cell tops which also contained heated outlet pipes and which supported a thermometer in the anolyte. A 1 mm. diameter platinum wire, 10 cm. long was sealed into the anolyte compartment and a 3 cmm. diameter iron wire, 10 cm. long, was sealed into the catholyte compartment.

Ethane purified as in Example 2 was passed through the anolyte compartment at 2 litres/hr. and dry hydrogen chloride was passed through the catholyte at 1.5 litres/hr. Electrolysis was carried out at 170° C. and atmospheric pressure with an electrolysing current of 0.2 amp 4.3 volts. The anodic product from a four hour run was collected in a cold trap at −70° C. and analysed as in Example 2. Chlorine was detected in the gas evolved at the anode and hydrogen was evolved at the cathode at approximately 25 mols/hr. The product contained 0.05 gm. of 1.2 dichloroethane and a trace of ethyl chloride.

EXAMPLE 8

A melt consisting of 400 gms. of mercuric chloride and 110 gms. of potassium chloride were electrolysed in the tube cell described in Example 7. The cathode consisted of an iron gauze of geometric area 20 cm. and the anode consisted of a 10 cm. length of 1 mm. diameter platinum wire.

Ethane purified as in Example 2 was passed through the catholyte at 5 litres/hr. Electrolysis was carried out at 270° C. and atmospheric pressure with an average electrolysing current of 0.2 ampere at a voltage which rose from 3 volts to 10 volts during the 2 hour run. The anodic product was collected in a cold trap at −70° C. At the conclusion of the run, approximately 0.2 mol of a clear liquid had condensed in the trap and analysis by vapour phase chromatography showed that the product was mainly ethyl chloride with traces of the isomeric dichloroethanes, 1,1,2-trichloroethane, tetrachloroethylene and two other components with retention times similar to vinyl chloride and trans 1,2-dichloroethylene. There was no chlorine detected in the gas evolved at the anode.

EXAMPLE 9

A melt consisting of 90 gms. of sodium chloride and 210 g. of aluminium chloride was prepared and 150 gms. of the melt were placed in the anolyte compartment of a simple U-tube type of cell. The glass cell consisted of two vertical arms 1.5 inches (3.8 cm.) diameter and 5 inches (12.7 cms.) long connected at the bottom by a 20 mm. diameter sintered glass disc which served as the diaphragm. The anode was a helix of nickel wire 10 cm. long and 3 mm. diameter sealed into the anolyte compartment and the cathode was a similar helix of iron wire sealed into the catholyte compartment.

Electrolysis was carried out for 5.4 hours and at a temperature of 160° C. with an electrolysing current of 0.02 ampere. A dry mixture of commercial ethane and hydrogen chloride was fed to the anolyte via a dip pipe, and dry hydrogen chloride was fed to the catholyte.

Hydrogen was evolved at the cathode at an average rate of 35 mls./hr. which corresponds to 40% current efficiency. Chlorine was detected in the gas evolved from the anode. This gas was passed through a cold trap maintained at −70° C. Some of the material which condensed in the cold trap vapourised when heated to room temperature leaving a residue of about 0.2 gm. of liquid. Infra-red analysis showed that the volatile fraction contained 0.049 litres of 1,2-dichloroethane and that the liquid contained 60% 1,2-dichloroethane and 40% 1,1,2,2-tetrachloroethane.

What I claim is:

1. A process for halogenating an organic compound selected from the group consisting of hydrocarbons and partially halogenated derivatives thereof, which comprises electrolyzing a fused electrolyte consisting essentially of at least one of the said organic compounds and at least one metallic halide which on electrolysis yields free halogen other than fluorine.

2. The process of claim 1 wherein said organic compound is a partially chlorinated hydrocarbon.

3. The process of claim 1 wherein at least one of said metallic halides interacts with, or forms a complex with, said organic compound.

4. The process of claim 1 wherein the metallic halide is a halide of a metal selected from the group consisting of aluminum, boron, gallium, magnesium, zinc, iron, mercury and mixtures thereof.

5. The process of claim 4 wherein the metallic halide is selected from the group consisting of aluminum chloride, ferric chloride, mercuric chloride and mixtures thereof.

6. The process of claim 1 wherein the melting point of the electrolyte is lowered by the presence of a further halide selected from the group consisting of the alkali metal and alkaline earth halides and hydrogen halides.

7. The process of claim 6 wherein said electrolyte contains sodium chloride.

8. The process of claim 6 wherein said electrolyte contains more than 1 mole of aluminum chloride per mole of sodium chloride.

9. The process of claim 1 wherein the organic compound is selected from the group consisting of methane and ethane.

10. The process of claim 1 wherein the electrolysis is carried out at a temperature in the range of 90° C. to 220° C. and the potential used is between 2 and 10 volts.

11. The process of claim 10 wherein the potential is between 2 and 5 volts.

12. The process of claim 1 wherein hydrogen chloride is added to the electrolyte during the electrolysis.

References Cited

UNITED STATES PATENTS

| 3,129,151 | 4/1964 | Dess et al. | 204—61 XR |
| 3,321,386 | 5/1967 | Mill | 204—60 XR |
| 322,940 | 7/1885 | Kempf | 204—59 |

JOHN H. MACK, *Primary Examiner.*

ROBERT K. MIHALEK, *Examiner.*

D. R. VALENTINE, *Assistant Examiner.*